United States Patent
Gordon

(10) Patent No.: US 10,822,214 B2
(45) Date of Patent: Nov. 3, 2020

(54) MULTI-PURPOSE ADJUSTABLE CEILING SUSPENSION STORAGE HOIST

(71) Applicant: Spire LLC, Troy, VA (US)

(72) Inventor: Joshua Gordon, Troy, VA (US)

( * ) Notice: Subject to any disclaimer, the term of this patent is extended or adjusted under 35 U.S.C. 154(b) by 0 days.

(21) Appl. No.: 16/439,762

(22) Filed: Jun. 13, 2019

(65) Prior Publication Data

US 2019/0382249 A1    Dec. 19, 2019

Related U.S. Application Data

(60) Provisional application No. 62/684,518, filed on Jun. 13, 2018.

(51) Int. Cl.
*B66D 3/04*  (2006.01)
*B65G 1/04*  (2006.01)
*B63B 32/80* (2020.01)

(52) U.S. Cl.
CPC .............. *B66D 3/043* (2013.01); *B63B 32/80* (2020.02); *B65G 1/0457* (2013.01); *B66D 2700/023* (2013.01); *B66D 2700/026* (2013.01); *B66D 2700/05* (2013.01)

(58) Field of Classification Search
CPC .... B66D 3/043; B66D 3/04; B66D 2700/023; B66D 2700/026; B66D 2700/05; B65G 1/0457; B63B 32/80; B66F 7/02
See application file for complete search history.

(56) References Cited

U.S. PATENT DOCUMENTS

| | | | | |
|---|---|---|---|---|
| 983,957 | A * | 2/1911 | Trantham | B66D 3/04 254/338 |
| 1,801,247 | A * | 4/1931 | Hunter | E04H 6/04 135/90 |
| 2,793,904 | A * | 5/1957 | Gale | B66C 1/122 294/74 |
| 3,531,088 | A * | 9/1970 | Kraschnewski | E02F 3/48 254/292 |
| 3,622,025 | A * | 11/1971 | Petersen | B60P 3/1091 414/461 |
| 3,709,358 | A * | 1/1973 | Andrews | B65D 71/0092 206/451 |
| 3,743,341 | A * | 7/1973 | Gale | B66C 1/122 294/74 |

(Continued)

FOREIGN PATENT DOCUMENTS

| | | |
|---|---|---|
| CN | 205244785 | 5/2016 |
| DE | 29604371 | 7/1996 |
| WO | WO03051758 | 6/2003 |

*Primary Examiner* — Michael E Gallion
(74) *Attorney, Agent, or Firm* — Robinson IP Law, PLLC

(57) ABSTRACT

A hoist assembly includes: a rope; a first mount having a base and a pulley attached to the base; a second mount having a base and a pulley attached to the base; a first lift pulley movably associated with the first mount with the rope; a second lift pulley moveably associated with the second mount with the rope; a pair of support straps; a bracket located on each of the first lift pulley and second lift pulley for receiving one of the pair of support straps and one or more apertures formed through a side wall of the bracket; and a lateral strap secured at a first end through the one or more apertures of the bracket of the first lift pulley and at a second end through the one or more apertures of the bracket of the second lift pulley.

12 Claims, 3 Drawing Sheets

(56) References Cited

U.S. PATENT DOCUMENTS

| | | | | |
|---|---|---|---|---|
| 4,236,859 A * | 12/1980 | Steam | | B63C 3/12 |
| | | | | 254/281 |
| 5,051,027 A * | 9/1991 | Horton | | B63C 3/06 |
| | | | | 114/44 |
| 5,098,143 A * | 3/1992 | Hill | | B66C 1/122 |
| | | | | 294/67.41 |
| 5,281,077 A * | 1/1994 | Phillips | | B66F 7/02 |
| | | | | 187/242 |
| 5,354,035 A | 10/1994 | Helgren | | |
| 5,897,104 A * | 4/1999 | Garbiso | | B66C 1/18 |
| | | | | 248/327 |
| 5,950,844 A | 9/1999 | Taylor | | |
| 6,056,274 A * | 5/2000 | Naas | | B63C 15/00 |
| | | | | 248/317 |
| 6,152,427 A * | 11/2000 | Hoslett | | B60J 11/00 |
| | | | | 248/327 |
| 7,494,110 B2 | 2/2009 | Lob et al. | | |
| 7,527,242 B2 * | 5/2009 | Shaha | | E04H 6/42 |
| | | | | 182/144 |
| 7,631,854 B1 | 12/2009 | Mountain | | |
| 8,033,529 B2 * | 10/2011 | Boda | | B62H 3/12 |
| | | | | 254/372 |
| 9,909,713 B1 * | 3/2018 | Brockie | | F16M 13/022 |
| 9,932,209 B2 * | 4/2018 | Smith | | A47B 81/00 |
| 2002/0178497 A1 * | 12/2002 | Thurston | | A47C 17/84 |
| | | | | 5/10.1 |
| 2004/0046161 A1 * | 3/2004 | Payne | | B60P 7/00 |
| | | | | 254/266 |
| 2008/0017839 A1 * | 1/2008 | Boda | | B66F 7/02 |
| | | | | 254/352 |
| 2008/0203046 A1 | 8/2008 | Friesen et al. | | |
| 2011/0127477 A1 * | 6/2011 | Kokolis | | B66D 1/26 |
| | | | | 254/285 |
| 2012/0061544 A1 | 3/2012 | Boda et al. | | |
| 2012/0068133 A1 | 3/2012 | Ozarski | | |
| 2013/0207059 A1 * | 8/2013 | Imberi | | B66D 3/04 |
| | | | | 254/362 |
| 2014/0191101 A1 * | 7/2014 | Krause | | B62H 3/12 |
| | | | | 248/331 |
| 2015/0314838 A1 | 11/2015 | Adolpho | | |

* cited by examiner

MULTI-PURPOSE ADJUSTABLE CEILING SUSPENSION STORAGE HOIST

CROSS-REFERENCE TO RELATED APPLICATION

This application claims priority to and is a non provisional of U.S. Patent Application Ser. No. 62/684,518 for a "Multi-purpose, adjustable ceiling suspension storage hoist" filed on Jun. 13, 2019, the contents of which are incorporated herein by reference in its entirety.

FIELD

This disclosure relates to the field of hoists and lifts. More particularly, this disclosure relates to a hoist assembly for raising and storing items proximate to a ceiling of a storage area.

BACKGROUND

Various types of racks and hoists exist for supporting sporting equipment. In particular, hoists and racks exist for storing large sporting good items such as kayaks, surfboards, and canoes. Large sporting goods often occupy a substantial amount of space in a storage area, such as a garage. Further, it is difficult to lift or otherwise manipulate large sporting goods such as kayaks, surfboards, and canoes for storage.

While various attempts have been made to provide hoists and other lifts, such devices are typically not well suited for supporting items such as kayaks, surfboards, and canoes. For example, existing devices may be unstable and prone to moving during lifting of the item. Further, it may be difficult to manipulate various straps and hooks to support the item on existing hoists or lifts. Additional existing hoists and lifts may further be substantially complicated and require various components to lift and secure an item.

What is needed, therefore, is a simple and stable hoist assembly for lifting an item such as a canoe, kayak, or surf board and securing the item off the ground.

SUMMARY

The above and other needs are met by a hoist assembly for lifting an item. In a first aspect, a hoist assembly includes: a rope; a first mount securable on a mounting surface; a second mount securable on a mounting surface; a first lift pulley located substantially beneath the first mount, the first lift pulley movably associated with the first mount with the rope; a second lift pulley located substantially beneath the second mount, the second lift pulley moveably associated with the second mount with the rope; a pair of support straps; and a lateral strap secured at a first end to the first lift pulley and at a second end to the second lift pulley. The hoist assembly is moving an item from a lowered position to a lifted position, and wherein the lateral strap maintains a location of the first lift pulley relative to a position of the second lift pulley during movement of the hoist assembly.

In one embodiment, the hoist assembly further includes: a bracket located on each of the first lift pulley and second lift pulley, the bracket including an opening formed through a center of the bracket for receiving one of the pair of support straps and one or more apertures formed through a side wall of the bracket.

In one embodiment, the hoist assembly further includes a rope brake located proximate to one of the first mount and the second mount. In another embodiment, the lateral strap is adjustable in length between the first lift pulley and the second lift pulley.

In yet another embodiment, ends of the item are tapered. In one embodiment, the item is selected from the group consisting of a kayak, canoe, surf board, and stand up paddle board.

In another embodiment, the hoist assembly further includes a tie off for securing the rope and hoist assembly in the lifted position. In yet another embodiment, the hoist assembly further includes a clasp formed along a length of the lateral strap for adjusting a length of the lateral strap between the first lift pulley and the second lift pulley.

In one embodiment, the bracket is rectangular in shape. In another embodiment, the pair of support straps are supported on a lower side of the rectangular bracket, and wherein the lateral strap is secured to the bracket through a side wall of the rectangular bracket.

In yet another embodiment, each of the first mount and the second mount further comprising a base and a pulley attached to the base.

In a second aspect, a hoist assembly includes: a rope; a first mount having a base and a pulley attached to the base; a second mount having a base and a pulley attached to the base; a first lift pulley located substantially beneath the first mount, the first lift pulley movably associated with the first mount with the rope; a second lift pulley located substantially beneath the second mount, the second lift pulley moveably associated with the second mount with the rope; a pair of support straps; a rectangular bracket located on each of the first lift pulley and second lift pulley, the bracket including an opening formed through a center of the bracket for receiving one of the pair of support straps and one or more apertures formed through a side wall of the bracket; and a lateral strap secured at a first end through the one or more apertures of the bracket of the first lift pulley and at a second end through the one or more apertures of the bracket of the second lift pulley, wherein the lateral strap is adjustable in length. The hoist assembly is moving an item from a lowered position to a lifted position, and wherein the lateral strap maintains a location of the first lift pulley relative to a position of the second lift pulley beneath during movement of the hoist assembly.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

Figure 1:
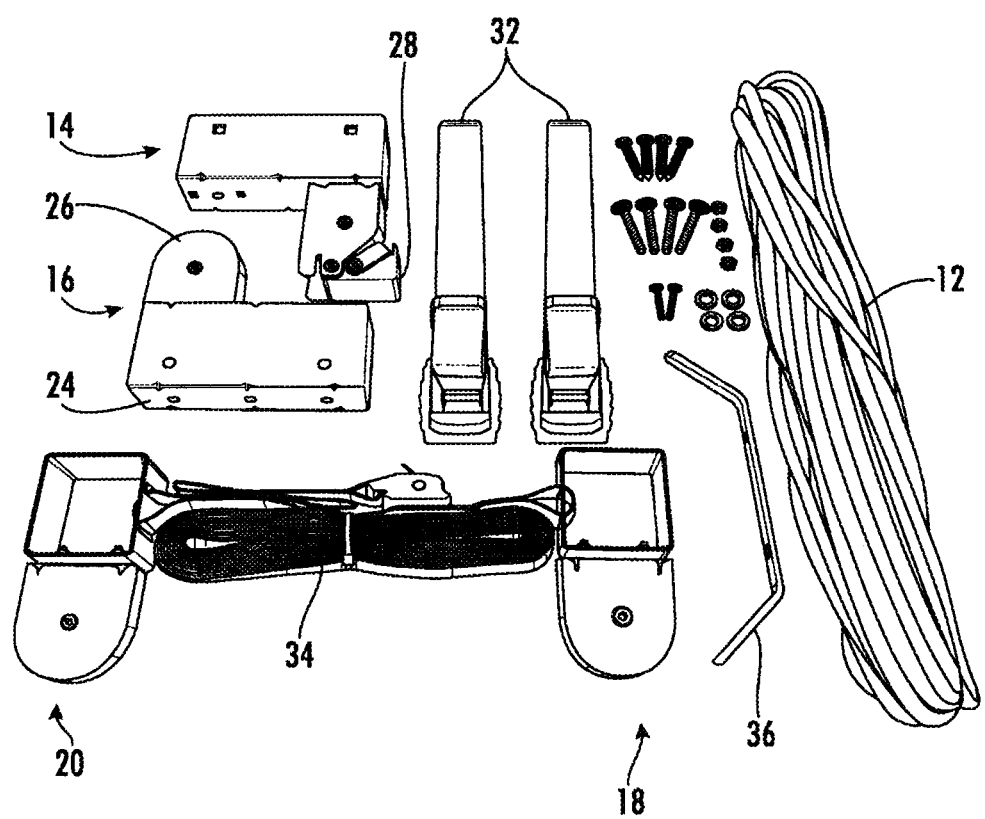
FIG. 1 shows components of a hoist assembly according to one embodiment of the present disclosure.

FIG. 1 shows a basic embodiment of components of a hoist assembly 10 for securing an item on a ceiling or other similar surface. Items supported by the hoist assembly 10 preferably include sporting goods such as a kayak, canoe, surf board, paddle boards and other like items. In particular, embodiments of the hoist assembly 10 disclose herein are particularly suitable for supporting items having tapered ends, such as kayaks, canoes, surf boards, and paddle boards without allowing straps supporting the items to slip outwardly or otherwise disengage the item during lifting and storage.

Figure 3:
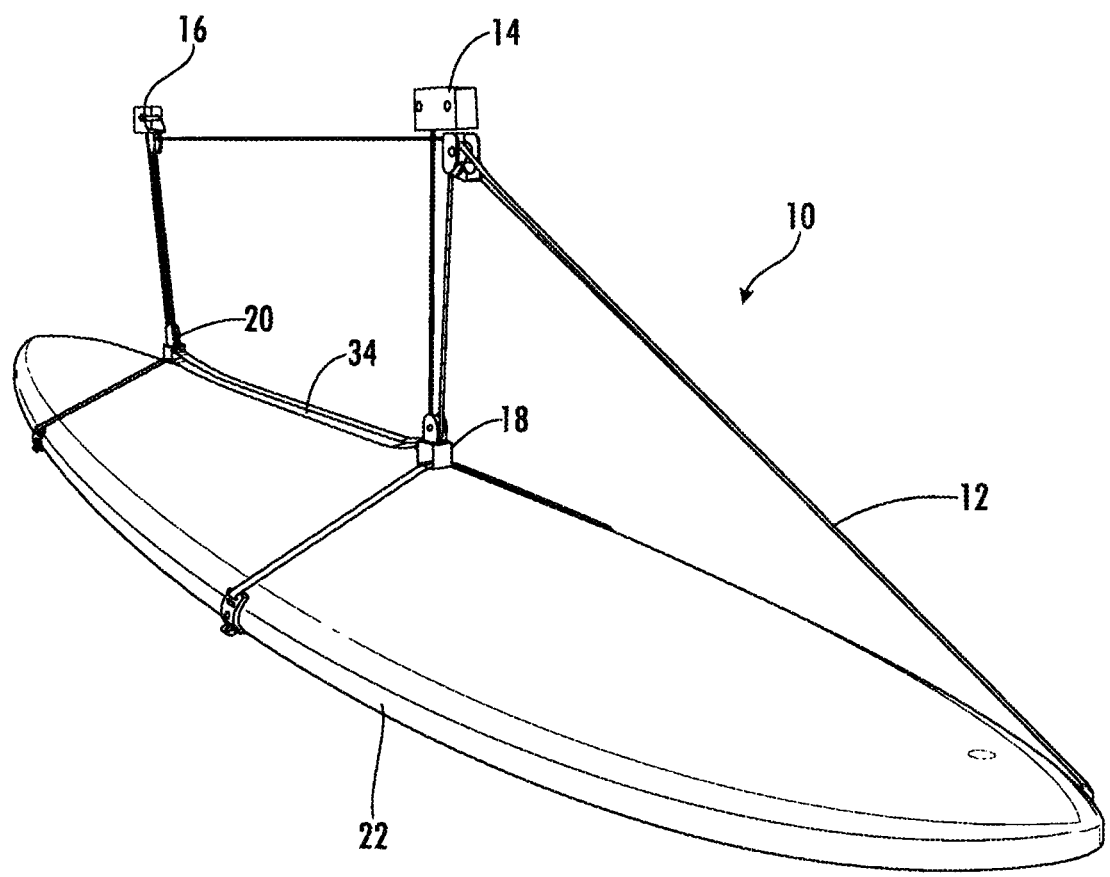
FIG. 3 shows a perspective view of an item supported on a hoist assembly according to one embodiment of the present disclosure.

The hoist assembly 10 includes a rope 12 for lifting an item supported on the hoist assembly 10, the rope 12 engaged with a first ceiling mount 14, second ceiling mount 16, first lift pulley 18, and second lift pulley 20. The rope 12 is engaged with components of the hoist assembly 10 such that a single length of the rope 12 is adapted to fit through each of the first ceiling mount 14, second ceiling mount 16, first lift pulley 18, and second lift pulley 20 to lift an item 22 (FIG. 3).

With further reference to FIG. 1, the first ceiling mount 14 preferably includes a base 24 for securing the first ceiling mount 14 to a surface, such as a ceiling, stud, or beam. The base 24 is preferably rectangular in shape and is substantially low profile to facilitate allowing the item 22 to be located substantially adjacent a ceiling, stud, or beam to which the base is attached when the item 22 is stowed. The base 24 includes a base pulley 26 attached thereon for receiving the rope 12. The second ceiling mount 16 is substantially similar in construction to the first ceiling mount 14 and includes the base 24 and the base pulley 26 attached thereon. The base pulley 26 of the first ceiling mount 14 is preferably configured to allow the rope 12 to engage the base pulley 26 twice, such as in a side-by-side arrangement around at least a portion of the base pulley 26 for supporting the rope 12 as described in greater detail below.

A rope brake 28 is attached to at least one of the first ceiling mount 14 and the second ceiling mount 16 for releasably engaging the rope 12 to prevent lowering of the item 22 when the hoist assembly 10 is in a stowed position. In one embodiment, the rope brake 28 is pivotally attached to the base 24 adjacent the base pulley 26. The rope brake 28 is preferably biased towards a locked position and further preferably allows the item 22 to be lifted without allowing lowering of the item 22 unless the rope brake 28 is released.

Figure 2:
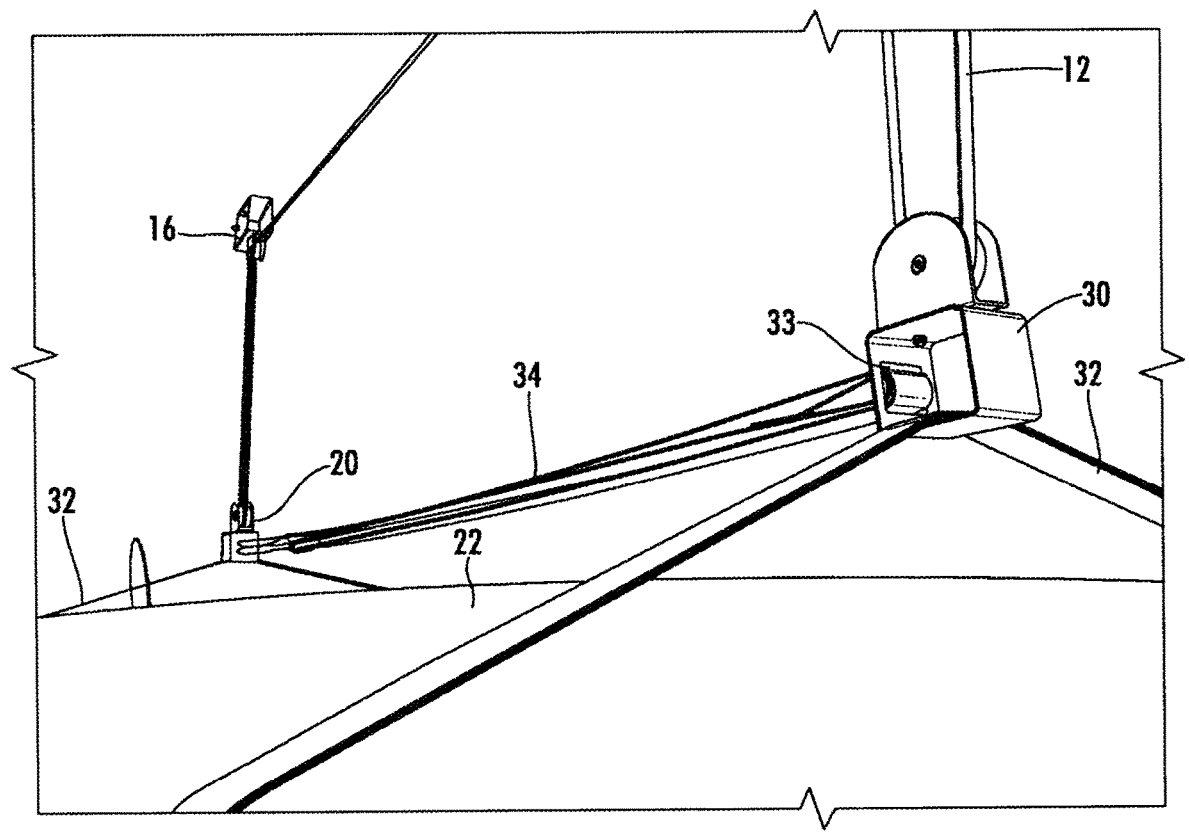
FIG. 2 shows a close up view of a hoist assembly having a lateral strap and item supported on the hoist assembly according to one embodiment of the present disclosure.

Referring now to FIG. 2, each of the first lift pulley 18 and the second lift pulley 20 includes a bracket 30 secured thereon. The bracket 30 is preferably rectangular in shape and includes an opening formed laterally through the bracket 30 for engaging a support strap 32. The support strap 32 is preferably threaded through the opening formed through the bracket 30 and around the item 22 such that the item is supported by the bracket 30 when lifted by the hoist assembly 10. The support strap 32 is preferably adjustable in length such that the support strap 32 may be adjusted to fit around various items supported on the hoist assembly 10.

The bracket 30 further includes one or more sides formed around the opening. The bracket 30 is preferably rectangular in shape with a hollow interior and a plurality of sidewalls formed around the hollow interior. However, it is also understood that the bracket may be formed in various other suitable shapes, such as circular or other polygonal shapes. The bracket 30 includes one or more apertures 33 formed through a side of the bracket 30 for receiving a lateral strap 34 therethrough. The lateral strap 34 is secured to the bracket 30 of each of the first lift pulley 18 and second lift pulley 20 and is adjustable in length such that the lateral strap 34 may prevent the first lift pulley 18 and second lift pulley 20 from separating during lifting of the item 22. The lateral strap 34 is preferably adjustable in length, such as by using a clasp or other mechanism located along the lateral strap 34 such that a user may adjust a length of the lateral strap 34 between the first lift pulley 18 and second lift pulley 20.

The hoist assembly 10 is preferably provided as a kit of parts, as shown in FIG. 1, and is installed on a surface, and more preferably on a ceiling or one or more beams or joists of a ceiling. The first ceiling mount 14 and second ceiling mount 16 are preferably first installed on the surface, such as by inserting one or more fasteners through apertures formed in a surface of the base 24 of the first ceiling mount 14 and second ceiling mount 16 located adjacent to the surface. Referring to FIG. 3, the rope 12 is preferably secured at a first end to the first ceiling mount 14 and at a second end to the second ceiling mount 16. The rope 12 is positioned around the second lift pulley 20 and then around the base pulley 26 of the second ceiling mount 16. The rope 12 extends across a distance between the first ceiling mount 14 and the second ceiling mount 16 and around the base pulley 26 of the first ceiling mount 14. The rope 12 is secured around the first lift pulley 18, back around the base pulley 26 of the first ceiling mount 14 before being secured to the first ceiling mount 14. The rope 12 forms a loop extending from the first ceiling mount 14 such that a user may grasp the rope 12 to pull the first lift pulley 18 and the second lift pulley 20 upwards towards the first ceiling mount 14 and the second ceiling mount 16.

In a lowered position, the first lift pulley 18 and the second lift pulley 20 are distal from the first ceiling mount 14 and the second ceiling mount 16 and are preferably located next to a floor or ground surface. The item 22, such as a kayak, canoe, surf board, or stand up paddle board is secured on the support straps 32. A first of the support straps 32 is placed around a first end of the item 22, such as around a hull of a kayak, and passes through the opening formed in the bracket 30 of the first lift pulley 18. A second of the support straps 32 is placed around a second end of the item 22 and passes through the opening formed in the bracket 30 of the second lift pulley 20.

The support straps 32 are placed at desired locations along the items, such as towards first and second ends of the item. The support straps 32 are preferably located along the item 22 directly such that when the support straps 32 are secured to the bracket of the first lift pulley 18 and second lift pulley 20, the first lift pulley 18 is located directly under the first ceiling mount and the second lift pulley 20 is located directly under the second ceiling mount 16.

The lateral strap 34 is secured at a first end to the bracket 30 of the first lift pulley 18 and at a second end to the bracket 30 of the second lift pulley 20 as described above. A length of the lateral strap 34 is adjusted such that the lateral strap 34 extends between the first lift pulley 18 and second lift pulley 20 and to prevent the first lift pulley 18 and second lift pulley 20 from spreading apart from one another during lifting and storage of an item.

After securing the item 22 in the support straps 32 and the lateral strap 34 between the first lift pulley 18 and the second lift pulley 20, the user may pull on the looped portion of the rope 12, thereby causing the item 22 to be lifted on the first lift pulley 18 and the second lift pulley 20. The user pulls the rope 12 until the item is raised to a desired position, preferably proximate to a ceiling or other surface on which the first ceiling mount 14 and second ceiling mount 16 are secured. When raised to the desired position, the hoist assembly 10 maintains the item 22 in the stowed position, such as by securing the rope 12 with the rope brake 28. A tie off 36 may be mounted on a nearby surface, such as a wall, around which the rope 12 may be wrapped to further prevent the hoist assembly 10 from lowering the item 22.

Embodiments of the hoist assembly described herein advantageously secure an item for lifting from a floor or ground surface to a stowed position near a ceiling of a structure. The hoist assembly is capable of lifting items having tapered ends, such as canoes, kayaks, surf boards, stand up paddle boards, and other similar items while preventing the straps securing the item from sliding towards tapered ends of the item and from potentially slipping off of the item such that the item is dropped. This arrangement is particularly advantageous when the hoist assembly is in the lowered position. Further, embodiments maintain components of the hoist assembly in alignment during lifting of the item such that effort to lift the item is reduced and such that the item may be drawn upward and tightly adjacent to the ceiling or other surface on which the hoist assembly is installed. Locating the support strap through the opening formed in the bracket further secures a location of the support strap and ensures that the support strap is not disengaged from the bracket or lift pulley during lifting of the item.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A hoist assembly comprising:
   a rope;
   a first mount securable on a mounting surface;
   a second mount securable on a mounting surface;
   a first lift pulley located substantially beneath the first mount, the first lift pulley movably associated with the first mount with the rope;
   a second lift pulley located substantially beneath the second mount, the second lift pulley moveably associated with the second mount with the rope;
   a pair of support straps;
   a lateral strap secured at a first end to the first lift pulley and at a second end to the second lift pulley;
   wherein the hoist assembly is moving an item from a lowered position to a lifted position, and wherein the lateral strap maintains a location of the first lift pulley relative to a position of the second lift pulley during movement of the hoist assembly.

2. The hoist assembly of claim 1, further comprising: a bracket located on each of the first lift pulley and second lift pulley, the bracket including an opening formed through a center of the bracket for receiving one of the pair of support straps and one or more apertures formed through a side wall of the bracket.

3. The hoist assembly of claim 1, further comprising a rope brake located proximate to one of the first mount and the second mount.

4. The hoist assembly of claim 1, wherein the lateral strap is adjustable in length between the first lift pulley and the second lift pulley.

5. The hoist assembly of claim 1, wherein ends of the item are tapered.

6. The hoist assembly of claim 5, the item selected from the group consisting of a kayak, canoe, surf board, and stand up paddle board.

7. The hoist assembly of claim 1, further comprising a tie off for securing the rope and hoist assembly in the lifted position.

8. The hoist assembly of claim 1, further comprising a clasp formed along a length of the lateral strap for adjusting a length of the lateral strap between the first lift pulley and the second lift pulley.

9. The hoist assembly of claim 2, wherein the bracket is rectangular in shape.

10. The hoist assembly of claim 9, wherein the pair of support straps are supported on a lower side of the rectangular bracket, and wherein the lateral strap is secured to the bracket through a side wall of the rectangular bracket.

11. The hoist assembly of claim 1, each of the first mount and the second mount further comprising a base and a pulley attached to the base.

12. A hoist assembly comprising:
    a rope;
    a first mount having a base and a pulley attached to the base;
    a second mount having a base and a pulley attached to the base;
    a first lift pulley located substantially beneath the first mount, the first lift pulley movably associated with the first mount with the rope;
    a second lift pulley located substantially beneath the second mount, the second lift pulley moveably associated with the second mount with the rope;
    a pair of support straps;
    a rectangular bracket located on each of the first lift pulley and second lift pulley, the bracket including
       an opening formed through a center of the bracket for receiving one of the pair of support straps and
       one or more apertures formed through a side wall of the bracket;
    a lateral strap secured at a first end through the one or more apertures of the bracket of the first lift pulley and at a second end through the one or more apertures of the bracket of the second lift pulley, wherein the lateral strap is adjustable in length;
    wherein the hoist assembly is moving an item from a lowered position to a lifted position, and wherein the lateral strap maintains a location of the first lift pulley relative to a position of the second lift pulley beneath during movement of the hoist assembly.

* * * * *